United States Patent [19]

Nakamura

[11] Patent Number: 5,404,991
[45] Date of Patent: Apr. 11, 1995

[54] ARTICLE ORIENTING DEVICE

[75] Inventor: Akira Nakamura, Tokyo, Japan

[73] Assignee: Riso Kagaku Corporation, Tokyo, Japan

[21] Appl. No.: 161,421

[22] Filed: Dec. 6, 1993

[30] Foreign Application Priority Data

Dec. 10, 1992 [JP] Japan .................................. 4-330187

[51] Int. Cl.$^6$ ............................................. B65G 47/24
[52] U.S. Cl. .................................................. 198/400
[58] Field of Search ................ 198/396, 400, 406, 383

[56] References Cited

U.S. PATENT DOCUMENTS

| 845,415 | 2/1907 | Hicks | 198/400 X |
| 1,456,216 | 5/1923 | Brightman | 198/400 |
| 2,775,334 | 12/1956 | Jeremiah | 198/400 X |
| 3,710,924 | 1/1973 | Schultz | 198/400 |
| 4,214,656 | 7/1980 | McDonald et al. | 198/400 X |
| 4,362,234 | 12/1982 | McDonald et al. | 198/400 |

FOREIGN PATENT DOCUMENTS 0506015  9/1954  Canada .................................. 198/400

Primary Examiner—James R. Bidwell
Attorney, Agent, or Firm—Dickstein, Shapiro & Morin

[57] ABSTRACT

Most articles such as component parts have a bottom end and a top end, and can take a normal stable upright attitude with said top end up, and an inverted stable upright position with the bottom end up, and has a gravitational center which is offset from a middle point between the top end and the bottom end toward the bottom end. Such component parts may be conveniently oriented into a uniform attitude by placing each component part on a fulcrum at its middle point, and allowing it to assume one of the stable attitudes. Preferably, the fulcrum is defined by a ridge extending longitudinally along a laterally central part of a bottom surface of a channel along which the component part is conveyed. Thus, all the component parts handled by this orienting device are properly oriented in a highly efficient manner and with a minimum dwell time in this device.

6 Claims, 9 Drawing Sheets

ARTICLE ORIENTING DEVICE

TECHNICAL FIELD

The present invention relates to a device for arranging the orientation of articles such as component parts. This invention is particularly suitable for feeding component parts to an assembling machine, and uniformly orienting each component part for the convenience of the operation of the assembling machine.

BACKGROUND OF THE INVENTION

Conventionally, rotary parts feeders making use of vibration have been widely used for arranging the orientation of component parts.

In a rotary parts feeder, components parts are guided along a spiral path defined on the inner surface of a bowl and moved along the path by being subjected to vibrations. A gate provided in the spiral path allows the passage of only those component parts that are oriented in a proper manner while those oriented in any other improper orientations are thrown off the spiral path so that the component parts having a uniform attitude are fed out of the parts feeder.

However, according to such a parts feeder, as it only allows the passage of properly oriented component parts while throwing those oriented in any improper manner back into the bowl, only a part of the component parts moving along the spiral path are allowed to be fed out of the parts feeder, and the efficiency of the feeding action is therefore substantially poor. Therefore, in assembly lines involving relatively high line speeds, it is often necessary to arrange a number of parts feeders in a parallel relationship for a single assembling machine.

Furthermore, because the improperly oriented component parts are thrown back into the bowl, and are again fed along the feeding path, the possibility of damaging the component parts is increased due to the increased dwell time of the component parts in the feeding path.

Normally, a component part which is required to be properly oriented when being fed has at least two stable orientations, and is not completely symmetric. Therefore, when the component part is placed in an intermediate orientation between these two stable orientations, its center of gravity is offset to one side, and the component part tends to change its orientation to one of the at least two orientations under the action of gravity.

BRIEF SUMMARY OF THE INVENTION

In view of such problems of the prior parts feeders, and the above described recognition by the inventors, a primary object of the present invention is to provide an article orienting device which is capable of orienting articles such as component parts in a highly efficient manner.

A second object of the present invention is to provided an article orienting device which can orient articles such as component parts with a minimum dwell time so that the articles may be promptly fed out with a minimum possibility of being damaged as they are being moved within the article orienting device.

A third object of the present invention is to provide an article orienting device which can orient articles such as component parts as they are being fed by using an extremely simple structure.

These and other objects of the present invention can be accomplished by providing an article orienting device for orienting an article such as a component part into a prescribed attitude, the article having at least two stable attitudes, and an attitude intermediate between the at least two stable attitude, and a center of gravity which is offset to one side of the article, comprising: fulcrum means for supporting the article at the intermediate attitude so that the article is tilted under the gravitational force toward one of the stable attitudes; introducing means for placing the article on the fulcrum means; and expelling means for expelling the article from the fulcrum means while retaining the component at the one of the stable attitudes. Normally, the article has a bottom end and a top end, and can take a normal stable upright attitude with the top end up, and an inverted stable upright position with the bottom end up, and has a gravitational center which is offset from a middle point between the top end and the bottom end toward the bottom end.

Thus, according to such a structure, all the component parts handled by this orienting device are properly oriented in a highly efficient manner and with a minimum dwell time in this device.

Furthermore, the device may have an extremely simple structure. For instance, the device comprises chute means defining a channel having a bottom surface and a pair of side walls on either side of the bottom surface, for conveying the article between the introducing means and the expelling means, and the fulcrum means comprises a ridge extending longitudinally along a laterally central part of the bottom surface of the channel.

To allow each article to be oriented into one of the stable attitudes with minimum complication and maximum efficiency, the channel has a width which increases from the first end of the channel to the second end of the channel, and/or the ridge has a height which increases relative to an associated height of the side walls from the first end of the channel to the second end of the channel.

The channel may have a downward inclination from the first end of the channel to the second end of the channel at such an angle as to allow the article to slide or roll down the channel under the gravitational force so as to eliminate any need for any powered actuator. If necessary, a powered actuator may be used. In either case, the article orienting device can be conveniently incorporated in an article feeding system without taking up any substantial space.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
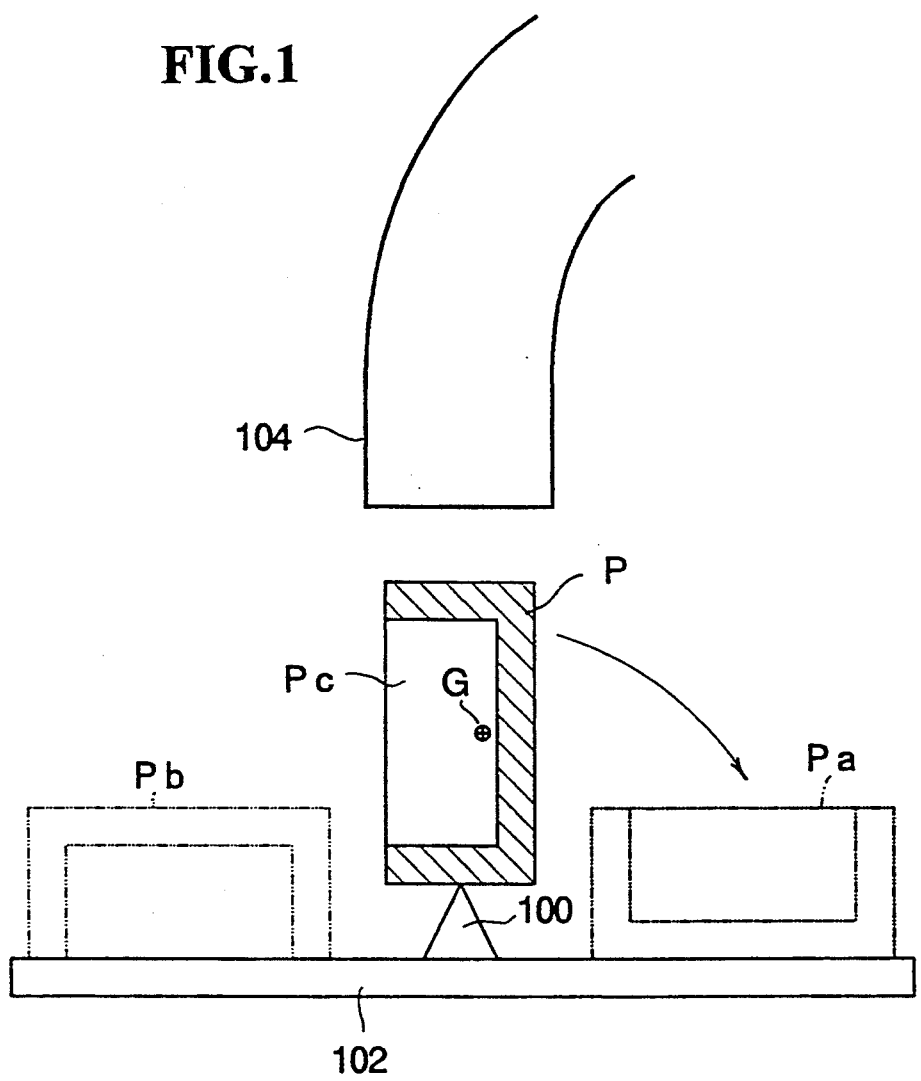
FIG. 1 is a schematic diagram showing the principle of the present invention.
Figure 2:
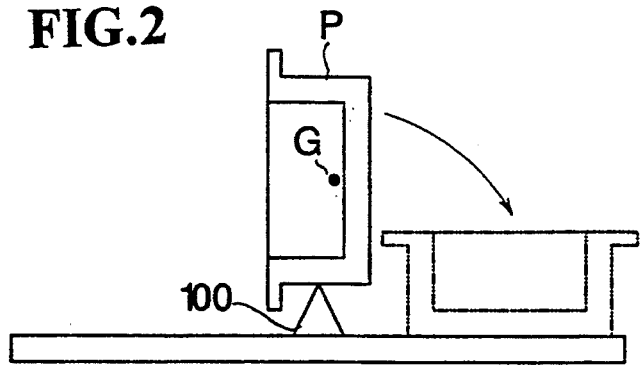
FIGS. 2 through 7 are schematic side views of articles that are suitable to be used with the article orienting device according to the present invention.
Figure 3:
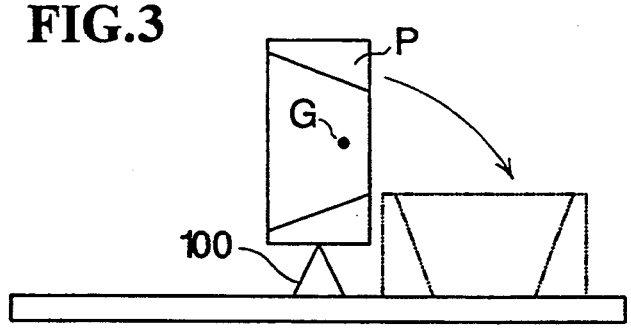
Figure 4:
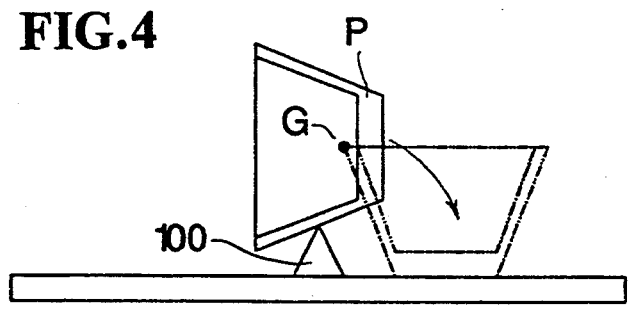
Figure 5:
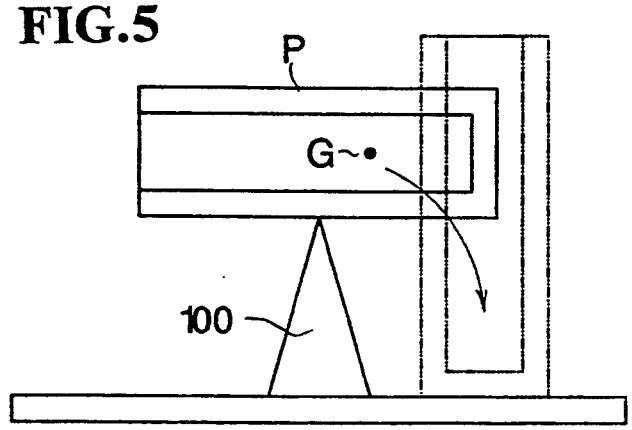
Figure 6:
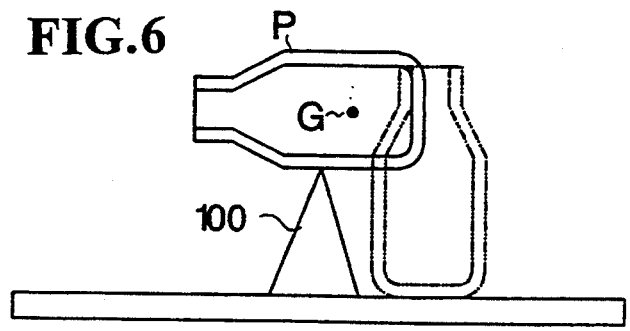
Figure 7:
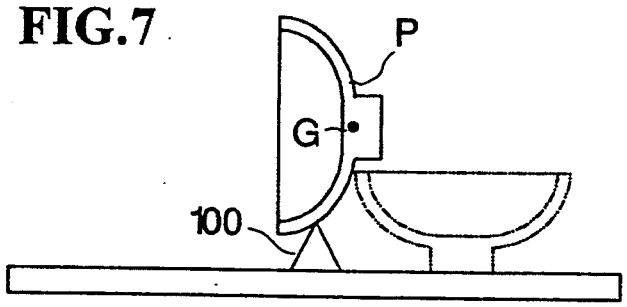
Figure 8:
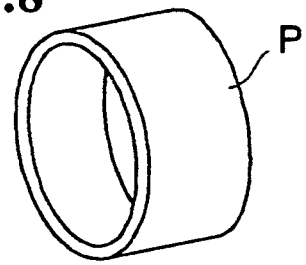
FIGS. 8 and 9 are schematic perspective views of articles that are suitable to be used with the article orienting device according to the present invention.
Figure 9:
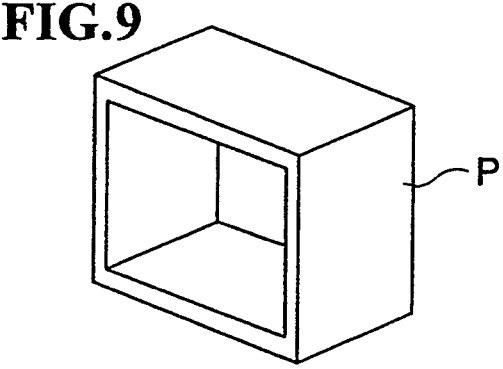

FIG. 1 shows a basic example of the article orienting device according to the present invention. This article orienting device constructed as component parts orienting device comprises a base plate 102 having a projection 100 on its upper surface, and a component parts introducing unit 104 for placing each component part on the projection 100 at an attitude Pc intermediate between two different stable attitudes Pa and Pb.

When each component part is placed on the projection 100 at an attitude oriented intermediate between the two stable attitudes, the center of gravity G is located on one side of the projection 100. Thus, the component part is tilted to the side on which the center of gravity G is located with the projection 100 serving as a fulcrum. As a result, the component part P is urged by the gravitational force toward one of its stable attitudes Pa associated with the center of gravity G, and is automatically arranged into a uniform attitude.

The component part illustrated in FIG. 1 is cup-shaped, but the present invention is applicable to all sorts of component parts each of which has a gravitational center on one side of a middle point of its height when this middle point is placed on the fulcrum at an unstable attitude Pc intermediate between two stable attitudes Pa and Pb. Examples of such component parts are given in FIGS. 2 through 7, and they may have such cross sectional shapes as circular, rectangular, polygonal and so forth.

Figure 10:
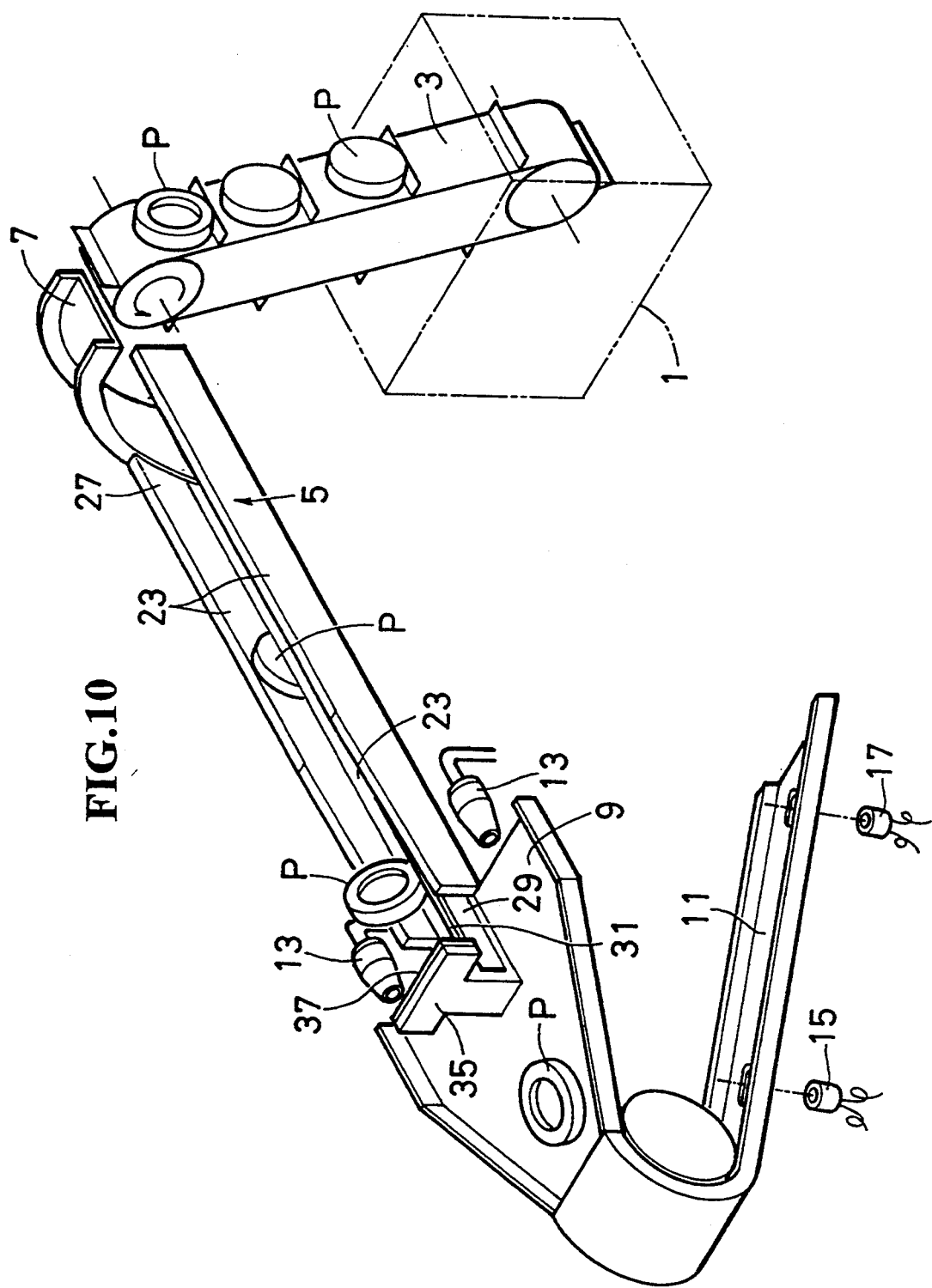
FIG. 10 is a perspective view showing a first embodiment of the article orienting device according to the present invention.
Figure 11:
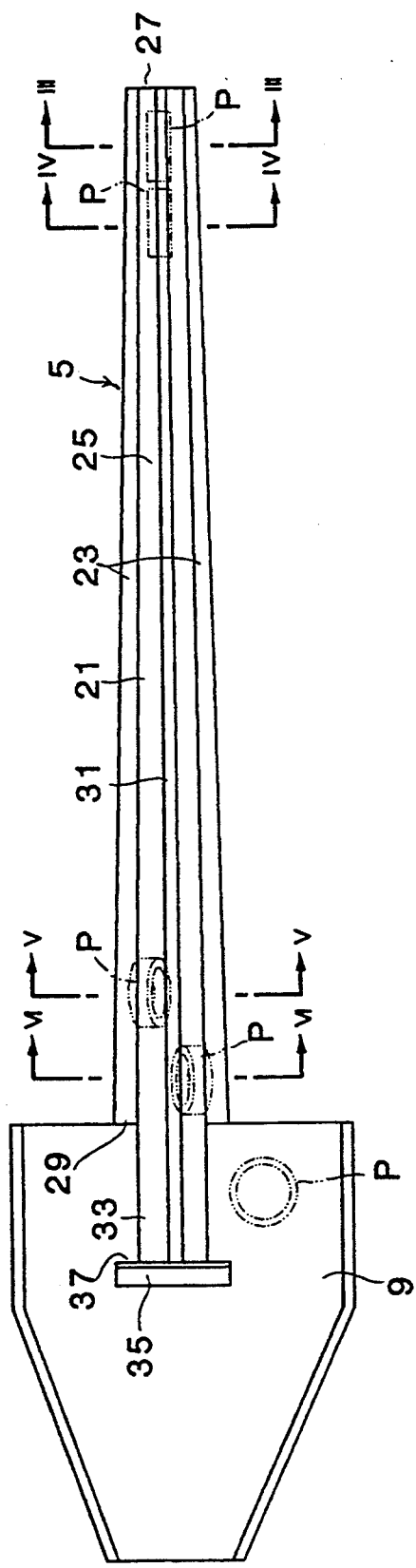
FIG. 11 is a plan view of the article orienting device.

FIGS. 10 through 12 show a component parts feeding device incorporated with a preferred embodiment of the component parts orienting device according to the present invention. Referring to FIG. 10, this component parts feeding device comprises an elevator hopper feeder 3 having vanes for individually picking up component parts P received in a hopper 1 and lifting them up to its upper end, a component parts orienting chute 5 forming an essential part of the component parts orienting device according to the present invention, an inlet chute 7 for feeding the component parts P into the component parts orienting chute 5 from the upper end of the elevator hopper feeder 3, a funnel chute 9 for receiving the component parts P uniformly oriented by the component parts orienting chute 5, a charging chute 11 for charging the component parts P uniformly oriented by the funnel chute 9 into an assembling machine not shown in the drawing, and air nozzles 13 for assisting the movement of the component parts P into the charging chute 11 by blowing air to the component parts P placed on the funnel chute 9.

A pair of photoelectric detecting sensors 15 and 17 are provided in the upstream and downstream ends of the charging chute 9, respectively. The detection signal from each of the detecting sensors 15 and 17 is supplied to a drive control unit (not shown in the drawing) of the elevator hopper feeder 3 for the purpose of controlling the flow of the component parts out of the component parts feeding device.

The component parts P handled by the above described feeder each consist of a cup-shaped member having a cylindrical side wall Ps and an end wall Pe closing an axial end of this cylindrical side wall Ps as illustrated in FIG. 12. Therefore, the center of gravity G of this component part P is offset toward the end wall Ps when it is supported at an axially intermediate point of the side wall Ps. Thus, this component part P has two upright stable attitudes, one with its end wall Pe down, and the other with its end wall Pe up, and an intermediate attitude with an axially central point of the side wall Ps supported by a fulcrum.

As best illustrated in FIGS. 11 and 12, the orienting chute 5 is provided with a bottom wall 21, and a pair of side walls 23 standing upright from either side end of the bottom wall 21, thus defining an open channel 25 having a rectangular cross section. This channel 25 is provided with a certain inclination, and, as illustrated in FIG. 10, its upper inlet end 27 is connected to the inlet chute 7 while its lower outlet end 29 is connected to the funnel chute 9.

A ridge 31 extending axially substantially over the entire length of the bottom wall 21 of the channel 25 projects from a laterally central part thereof. This ridge 31 is provided with a semi-circular or triangular cross section, and is therefore adapted to support the component parts P in an unstable manner.

The lateral width of the channel 25 or the spacing between the two side walls 26 gradually increases from the inlet end 27 to the outlet end 29, and the height of the side walls 23, conversely, gradually diminishes from the inlet end 27 to the outlet end 29. As shown in FIG. 12, the lateral width of the channel 25 at the inlet end 27 is greater than the height Pd of the component part P so as to be able to receive the component part P with its side down, but the spacing d between the central ridge 31 and each of the side walls 23 is smaller than the height Pd of the component part P so that each component part P introduced into the channel 25 with its side up from its inlet end 27 is always placed on the ridge 31 at its side.

As best illustrated in FIGS. 10 and 11, the bottom wall 21 of the channel 25 is provided with an extension 33 having two open sides at the outlet end of the channel 25, and a stopper plate 35 stands upright at an axial end of this extension 33 axially opposite to the outlet end 29 of the channel 25. The stopper plate 35 is adapted to stop each component part P rolling down along the channel 25 of the orienting chute 5, and a cushion layer 37 is placed on the surface of the stopper plate 35 for reducing the impact when stopping each component part P.

Figure 12A:
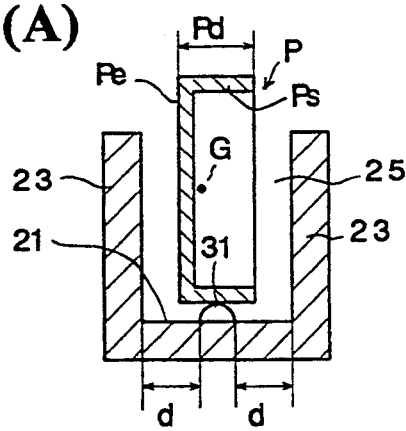
FIGS. 12 (A) through 12 (D) are enlarged sectional views taken along lines III—III, IV—IV, V—V and VI—VI of FIG. 11, respectively.
Figure 12B:
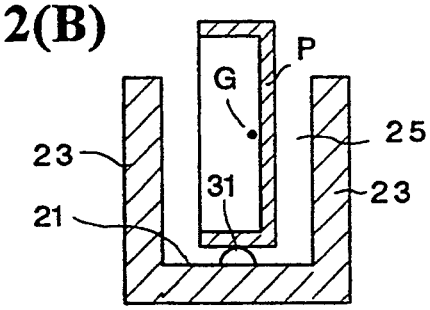
Figure 12C:
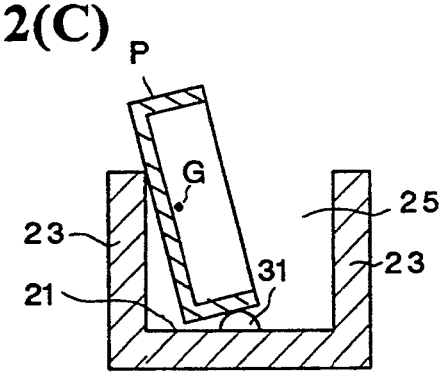
Figure 12D:
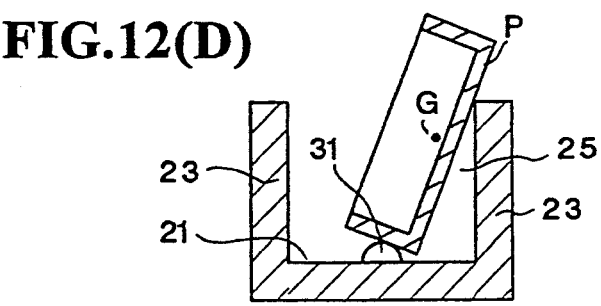

According to this structure, the component parts P are individually lifted by the elevator hopper feeder 3 from the hopper 1, and are fed into the inlet chute 7. The component parts P are then guided by the inlet chute 7, and are introduced into the inlet end 27 of the channel 25, at least approximately, with their side up. They are therefore placed on the ridge 31 in the channel 25 as illustrated in FIGS. 12(A) and 12 (B), and are thereby tilted with their bottom down under the gravitational force with the ridge 31 serving as a fulcrum, as the component parts roll down the channel 25, as illustrated in FIGS. 12(C) and 12 (D). Because the channel 25 widens and the side walls 23 become lower as the component parts roll down the channel 25, the inclination of the component parts P increases toward the side of the gravitational center G as they roll down the channel 25. Thus, the component parts are oriented in such a manner that the component parts which initially had their side up are oriented into an attitude where each component part stands upright with its end wall Pe down.

The component parts P ejected from the outlet end 29 of the channel 25 continue to roll down on the extension 33 of the bottom wall 21, and because there are no side walls to this extension 33, the component parts are safely placed on the funnel chute 9 with their bottom down, or run into the cushion layer 37 of the stopper plate 35 and are eventually safely placed on the funnel chute 9 with their bottom down. Thus, all the component parts P placed on the funnel chute 9 are uniformly oriented with their end walls Pe down, and are further conveyed into the charging chute 11 by the air flow issuing from the air nozzles 13.

Figure 13:
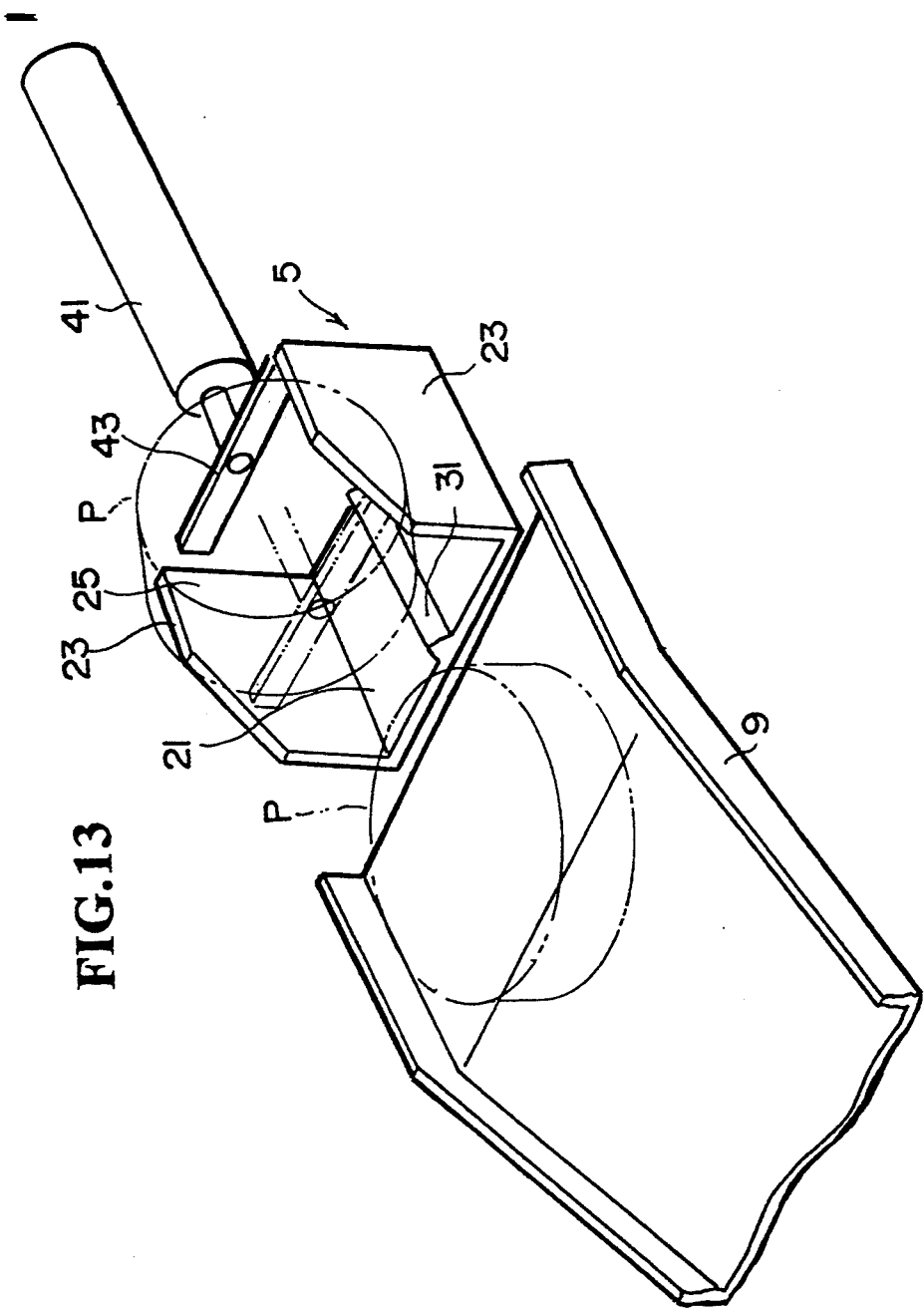
FIG. 13 is a perspective view of a second embodiment of the article orienting device according to the present invention.
Figure 14:
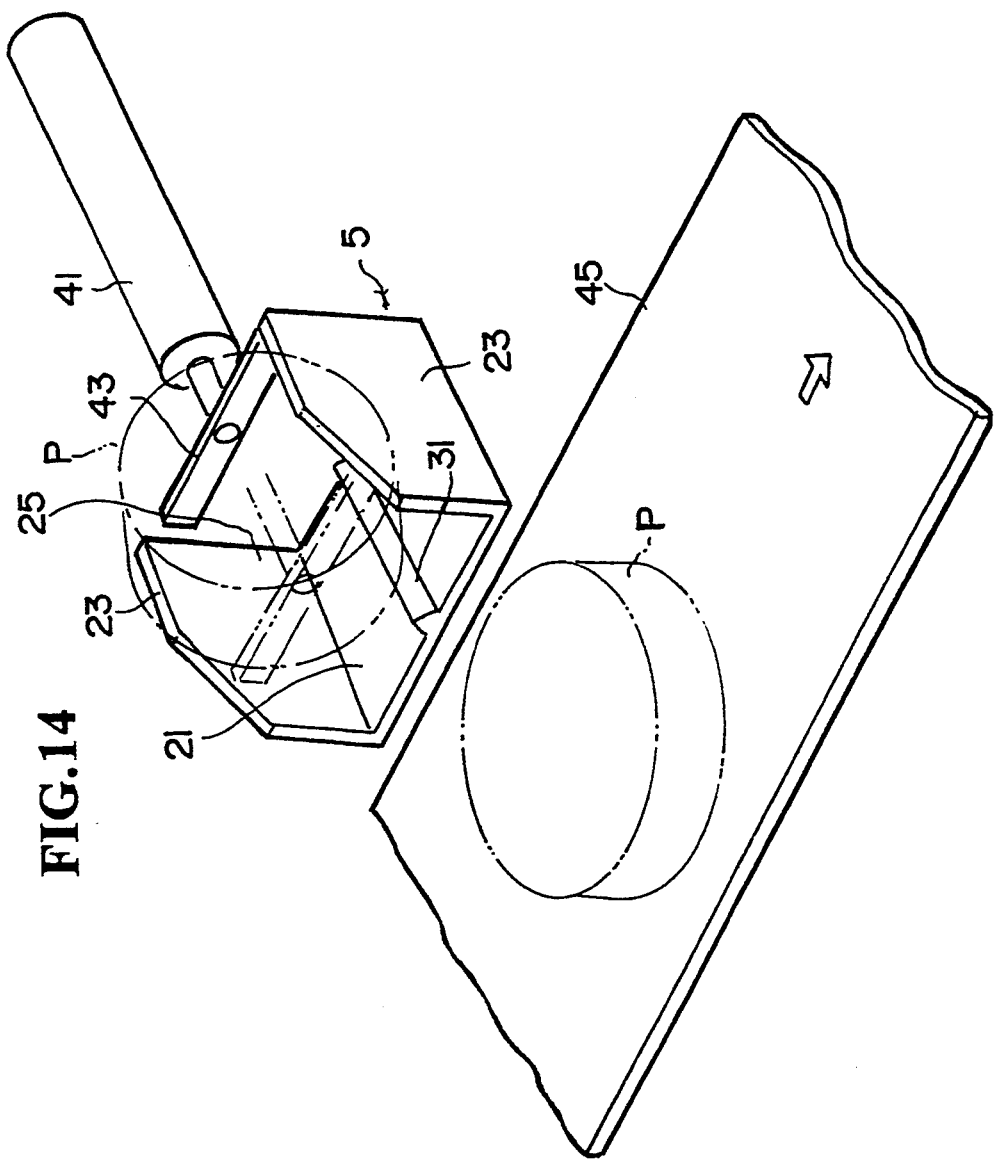
FIG. 14 is a perspective view of a third embodiment of the article orienting device according to the present invention.

In the above described embodiment, the orienting chute 5 was inclined so that the component parts P may be able to fall freely along the channel 25 under the gravitational force, but it is also possible to arrange the orienting chute 5 horizontally and provide a pneumatic or hydraulic actuator 41 for conveying the component parts P via a pusher member 43 as illustrated in FIG. 13. Also, as illustrated in FIG. 14, the orienting chute 5 may be connected at its outlet end to a belt conveyor 45 for conveying the component parts P in their uniformly oriented condition to the next station.

In the above described embodiment, the channel 25 gradually widened and the side walls 23 gradually reduced their height toward the outlet end 29 of the channel 25, but it may be that only either the channel 25 gradually widens or the side walls 23 gradually reduce their height toward the outlet end 29 of the channel 25.

Figure 15A:
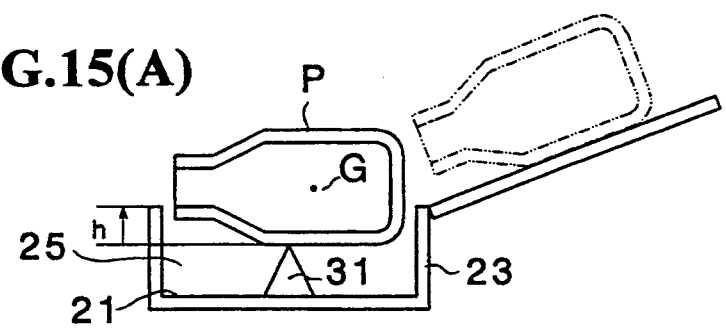
FIGS. 15 (A) through 15 (D) are sectional views showing a fourth embodiment of the article orienting device according to the present invention.
Figure 15B:
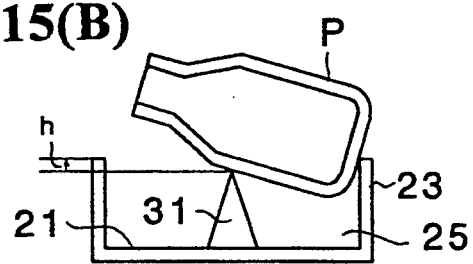
Figure 15C:
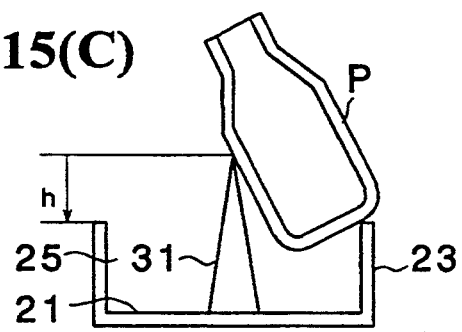
Figure 15D:
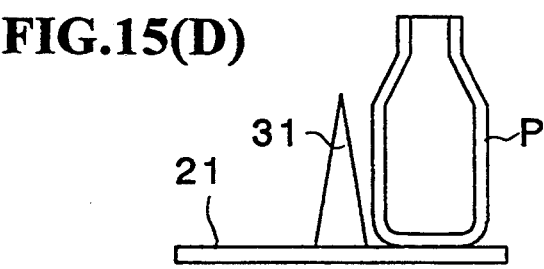

It is also possible that the relative height h of the side walls 23 with respect to the ridge 31 diminishes gradually from the inlet end 27 to the outlet end 29 of the channel 25 as illustrated in FIGS. 15(A) through 15(D). In this case, the height of the ridge 31 becomes greater than that of the side walls 23 in a downstream region of the channel as illustrated in FIG. 15(C), and in that case the height h may be considered to assume a negative value.

In the above described embodiment, some of the illustrated articles that are to be handled by the device of the present invention have circular cross sections, and were therefore adapted to roll down the channel 25. Other articles having non-circular cross sections may be adapted to slide down the channel 25 as required. In either case, when no power means is used for conveying the articles, the slope of the channel 25 must be such as to allow the articles to roll or slide down the channel under the gravitational force.

Thus, according to the present invention, all the component parts handled by this orienting device are properly oriented in a highly efficient manner and with a minimum dwell time in this device. Since the articles can be oriented in a gradual manner, for instance, by appropriately changing the width of the channel, and the height of the ridge relative to that of the side walls, the possibility of damaging the articles can be minimized.

Although the present invention has been described in terms of specific embodiments, it is possible to modify and alter details thereof without departing from the spirit of the present invention.

What we claim is:

1. An article orienting device for orienting an article into a prescribed attitude, said article having at least two stable attitudes, an intermediate attitude between said at least two stable attitudes, and a center of gravity which is offset to one side of said article, comprising:

fulcrum means for supporting said article at said intermediate attitude so that said article is tilted under a gravitational force toward one of said stable attitudes;

introducing means for placing said article on said fulcrum means;

expelling means for expelling said article from said fulcrum means while retaining said article at said one of said stable attitudes;

first chute means defining a channel having a bottom surface and a pair of walls on either side of said bottom surface for conveying said article between said introducing means and said expelling means; and second chute means for placing and conveying said article expelled by said expelling means;

wherein said fulcrum means comprises a ridge extending longitudinally along a laterally central part of said bottom surface of said channel and extending longitudinally from a first end of said channel associated with said introducing means to a second end of said channel associated with said expelling means at such an angle as to allow said article to slide or roll down said channel under the gravitational force; and wherein said expelling means comprises an extension having first and second openings formed therein at said second end of said channel, said first and second openings being large enough to allow said article to pass therethrough, and stopper plate means provided on said extension for stopping the sliding or rolling of said article.

2. An article orienting device according to claim 1, wherein said channel has a width which increases from said first end of said channel associated with said introducing means to said second end of said channel associated with said expelling means.

3. An article orienting device according to claim 1, wherein said ridge has a height which increases relative to height of said side walls from said first end of said channel associated with said introducing means to said second end of said channel associated with said expelling means.

4. An article orienting device according to claim 1, further comprising drive means for moving said article along said channel from said first end of said channel associated with said introducing means to said second end of said channel associated with said expelling means.

5. An article orienting device according to claim 1, wherein said article has a bottom end and a top end, and can take a normal stable upright attitude with said top end up, and an inverted stable upright position with said bottom end up, and has a gravitational center which is offset from a middle point between said top end and said bottom end toward said bottom end.

6. An article orienting device for orienting an article into a prescribed attitude, said article having at least two stable attitudes, an intermediate attitude between said at least two stable attitudes, and a center of gravity which is offset to one side of said article, comprising:

fulcrum means for supporting said article at said intermediate attitude so that said article is tilted under a gravitational force toward one of said stable attitudes;

introducing means for placing said article on said fulcrum means;

expelling means for expelling said article from said fulcrum means while retaining said article at said one of said stable attitudes;

first chute means defining a channel having a bottom surface and a pair of said walls on either side of said bottom surface for conveying said article between said introducing means and said expelling means;

second chute means for placing and conveying said article expelled by said expelling means;

detecting means for detecting whether or not said article is placed on a prescribed position in said second chute means; and controlling means for controlling a supply of said article to said introducing means in accordance with a detection signal from said detecting means.

* * * * *